(12) United States Patent
Akita

(10) Patent No.: US 8,114,511 B2
(45) Date of Patent: Feb. 14, 2012

(54) COMPOSITE POROUS MEMBRANE AND METHOD FOR PRODUCING THE SAME

(75) Inventor: Hiroshi Akita, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1022 days.

(21) Appl. No.: 12/072,767

(22) Filed: Feb. 28, 2008

(65) Prior Publication Data

US 2008/0213645 A1 Sep. 4, 2008

(30) Foreign Application Priority Data

Mar. 2, 2007 (JP) ................. 2007-052852

(51) Int. Cl.
*B32B 3/26* (2006.01)
*B32B 27/00* (2006.01)
*H01M 8/10* (2006.01)

(52) U.S. Cl. ............. 428/319.3; 428/312.2; 428/311.11; 428/312.8; 428/188; 429/188; 429/310; 429/311; 429/312; 429/314; 429/317

(58) Field of Classification Search ........................ None
See application file for complete search history.

(56) References Cited

U.S. PATENT DOCUMENTS 5,084,173 A * 1/1992 Nitadori et al. .......... 210/321.89

FOREIGN PATENT DOCUMENTS

JP 08-162132 6/1996

* cited by examiner

*Primary Examiner* — Ling Xu
(74) *Attorney, Agent, or Firm* — Nelson Mullins Riley & Scarborough LLP; Anthony A. Laurentano

(57) ABSTRACT

A composite porous membrane comprises a porous matrix and a polymer. The porous matrix contains a fiber woven fabric, a fiber nonwoven fabric, a porous metal material, or a porous inorganic material, and the polymer forms a three-dimensional network structure in the porous matrix. The composite porous membrane may be obtained by impregnating the porous matrix with a solution of the polymer, and by solidifying while stretching the polymer. Preferred examples of the porous matrix include glass fiber nonwoven fabrics, and preferred examples of the polymer include polybenzimidazoles.

4 Claims, 2 Drawing Sheets

FIG. 2

| | PBI SOLUTION IMPREGNATION AMOUNT g/cm² | POROSITY % BY VOLUME | AVERAGE PORE DIAMETER μm | TENSILE ELASTICITY GPa |
|---|---|---|---|---|
| EXAMPLE 1 | 0.012 | 94 | 0.9 | 0.88 |
| EXAMPLE 2 | 0.041 | 92 | 0.8 | 0.90 |
| EXAMPLE 3 | 0.071 | 90 | 0.6 | 0.92 |
| EXAMPLE 4 | 0.008 | 94 | 0.5 | 0.84 |
| EXAMPLE 5 | 0.011 | 93 | 0.3 | 0.92 |
| COMPARATIVE EXAMPLE 1 | - | 39 | 0.4 | 0.09 |
| COMPARATIVE EXAMPLE 2 | - | 90 | 5.0 | 0.16 |

COMPOSITE POROUS MEMBRANE AND METHOD FOR PRODUCING THE SAME

BACKGROUND OF THE INVENTION

1. Field of the Invention

The present invention relates to a composite porous membrane and a method for producing the same, and more particularly to a composite porous membrane capable of carrying a proton-conducting polymer to form a fuel cell electrolyte membrane and a method for producing the same.

2. Description of the Related Art

A direct methanol fuel cell contains an electrolyte-electrode joined assembly, obtained by forming an anode and a cathode on the surfaces of a proton-conducting electrolyte. The electrolyte-electrode assembly is sandwiched between a pair of separators to form a unit cell, and a plurality of the unit cells are stacked and tightened by a tie rod or the like, to produce a stack of the direct methanol fuel cell.

For example, NAFION (a perfluorosulfonic acid polymer membrane, available from DuPont) moistened with liquid water is used as the electrolyte conventionally. However, there is a demand for increasing the mechanical strength of the electrolyte to improve the durability in the above tightening step and during long-term operation of the fuel cell. In view of this demand, a composite membrane having an increased mechanical strength, obtained by impregnating pores (voids) of a stretched porous polytetrafluoroethylene membrane with NAFION, is proposed in Japanese Laid-Open Patent Publication No. 8-162132.

The stretched porous polytetrafluoroethylene membrane has a large number of minute nodes and linkages, and the linkages extend from the minute nodes and connect the minute nodes three-dimensionally. The minute nodes and the linkages are formed during the process of stretching and pore formation of a polytetrafluoroethylene sheet. It is reported that the membrane has a porosity of up to 98% by volume.

Further, a composite membrane, obtained by distributing a graft polymer having a sulfonic acid group in pores of a porous membrane, is also known.

The above polytetrafluoroethylene sheet having the remarkably large porosity is poor in rigidity, and thereby cannot be easily handled in the process of the stretching, pore formation, and impregnation with NAFION. Also the resultant composite membrane is poor in rigidity and thereby cannot be easily handled.

Further, such electrolyte membrane having low rigidity is often dimensionally changed due to creep or deformation in long-term operation of the fuel cell. In this case, various problems are caused, for example, the power generation capacity of the fuel cell is deteriorated, or a gas leaks from one electrode to the other electrode.

In a case where the pore diameters of the pores in the composite membrane containing the graft polymer are excessively large, it is difficult to occlude the pores by the graft polymer. For example, when a pore with a pore diameter of 10 µm is occluded by a polystyrene, the molecular weight of the polystyrene has to be several million or more. However, such a high-molecular-weight polymer cannot be easily produced by graft polymerization. When the pores are not sufficiently narrowed, disadvantageously a gas leaks from one electrode to the other electrode, and the power generation capacity of the fuel cell is deteriorated.

In addition, a known method for producing a porous membrane contains the steps of dissolving a polymer in a solvent in which the polymer shows a high solubility (hereinafter also referred to as a good solvent), casting the resultant solution on a substrate such as a glass plate to form a thin membrane, soaking the thin membrane in a solidifying bath of a solvent in which the polymer shows a low solubility (hereinafter also referred to as a poor solvent) to replace the good solvent by the poor solvent, and thereby causing the phase separation to solidify the polymer. However, the polymer is shrunk in the process of solidifying the polymer and drying the solidified polymer. Therefore, the porosity of the porous membrane is at most 60% to 70% by volume, and the membrane has only a small number of pores for carrying the proton-conducting polymer.

SUMMARY OF THE INVENTION

A general object of the present invention is to provide a composite porous membrane having a high rigidity in addition to a sufficient porosity.

A principal object of the present invention is to provide a composite porous membrane having small pores, which can be easily occluded by a proton-conducting polymer.

Another object of the present invention is to provide a method for producing the composite porous membranes.

According to an aspect of the present invention, there is provided a composite porous membrane comprising a porous matrix and a polymer, wherein the porous matrix comprises a fiber woven fabric, a fiber nonwoven fabric, a porous metal material, or a porous inorganic material, the polymer forms a three-dimensional network structure in the porous matrix, and the composite porous membrane has a porosity of 80% to 98% by volume and an average pore diameter of 1.0 µm or less.

The porous matrix comprising the above material has an excellent rigidity in addition to a high porosity. Since the polymer forms the three-dimensional network structure in the porous matrix, the pores are narrowed such that the average pore diameter is 1.0 µm or less. Therefore, the pores can be easily occluded by a proton-conducting polymer.

As described above, the composite porous membrane of the present invention contains the porous matrix and the polymer forming the three-dimensional network structure in the porous matrix, and thereby has an excellent rigidity in addition to a high porosity and has narrowed pores that can be easily occluded by a proton-conducting polymer.

Thus, the composite porous membrane has an excellent dimensional stability due to the porous matrix, and has the pores that can be occluded by a proton-conducting polymer. The composite porous membrane can be suitably used as a base for an electrolyte of a direct methanol fuel cell, etc. In this case, even when the fuel cell is driven for a long period, the electrolyte is hardly deformed and a gas does not leak from one electrode to the other electrode.

The porous matrix particularly preferably comprises the fiber nonwoven fabric. The fiber nonwoven fabric can show a high rigidity even though its porosity is more than 90% by volume. The fiber nonwoven fabric is excellent in dimensional stability despite its light weight. Thus, by using the fiber nonwoven fabric, the weight of the composite porous membrane can be reduced, and the dimensional change can be prevented.

The polymer preferably comprises a repeating unit derived from a condensed ring compound containing a 6-membered ring and a 5-membered heterocyclic ring. Further, the polymer more preferably comprises a repeating unit containing an ether bond. In this case, the polymer is excellent in strength, heat resistance, and chemical stability.

According to another aspect of the present invention, there is provided a method for producing a composite porous membrane comprising a porous matrix and a polymer, comprising the steps of: dissolving a polymer in a first solvent to prepare a solution; impregnating a porous matrix with the solution, the porous matrix comprising a fiber woven fabric, a fiber nonwoven fabric, a porous metal material, or a porous inorganic material; bringing a second solvent into contact with the porous matrix impregnated with the solution, the solubility of the polymer in the second solvent being lower than that in the first solvent; and thereby solidifying the polymer into a three-dimensional network structure while stretching the polymer to obtain a composite porous membrane having a porosity of 80% to 98% by volume and an average pore diameter of 1.0 µm or less.

When the first solvent and the second solvent are used as described above, phase separation is caused in the solution. As a result, the polymer forms the three-dimensional network structure, so that the composite porous membrane can be easily obtained.

When a vapor of the second solvent is brought into contact with the porous matrix impregnated with the solution, the first solvent can be slowly replaced by the second solvent. Therefore, the phase separation of the solution proceeds moderately, so that the resultant composite porous membrane has a small pore diameter with high porosity.

As described above, the polymer preferably comprises a repeating unit derived from a condensed ring compound containing a 6-membered ring and a 5-membered heterocyclic ring, and particularly preferably comprises a repeating unit containing an ether bond.

In a case where the polymer comprises a repeating unit containing an ether bond, it is preferred that the polymer is heat-treated after the solidification. The polymer is intermolecularly crosslinked by the heat treatment, whereby the strength, heat resistance, and chemical stability of the polymer or the composite porous membrane can be further improved.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a table showing the PBI solution impregnation amount, porosity, average pore diameter, and tensile elasticity of each membrane of Examples 1 to 5 and Comparative Examples 1 and 2.

DESCRIPTION OF THE PREFERRED EMBODIMENTS

Figure 1:
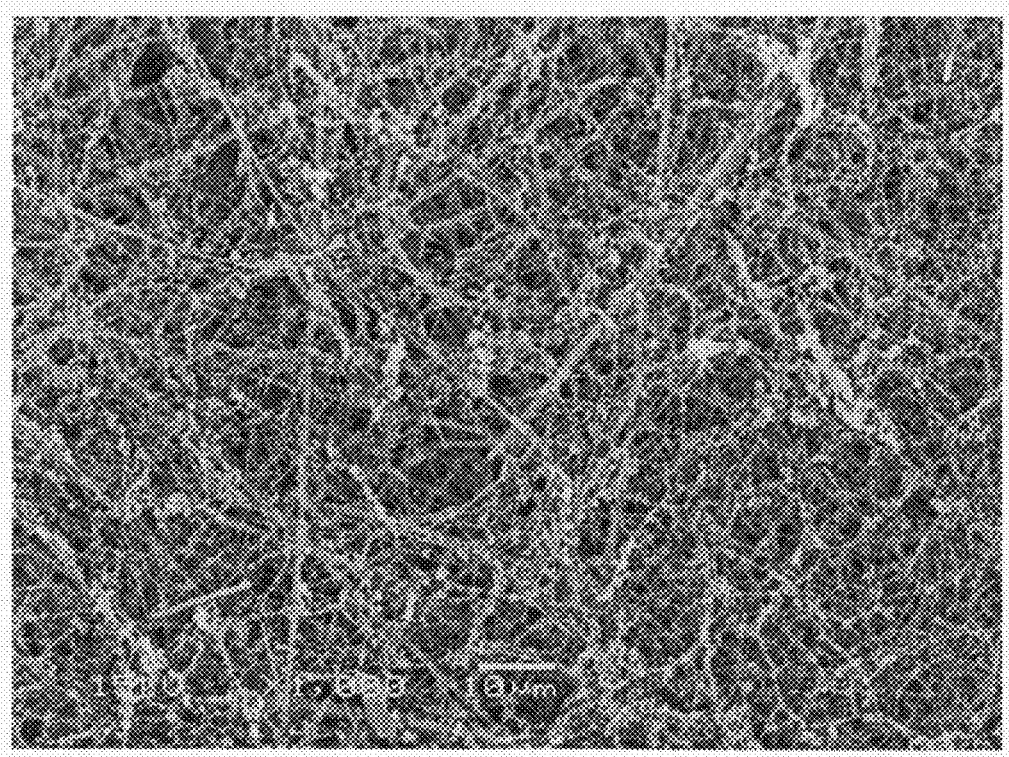
FIG. 1 is an SEM photograph of a surface of a composite porous membrane according to an embodiment of the present invention.

A preferred embodiment of the composite porous membrane and the producing method of the present invention will be described in detail below with reference to the drawings.

The composite porous membrane of this embodiment is a composite material containing a porous matrix and a polymer. The porous matrix contains a fiber woven fabric, a fiber nonwoven fabric, a porous metal material, or a porous inorganic material.

In the case of using the fiber woven fabric or the fiber nonwoven fabric in the porous matrix, preferred examples of the fibers include glass fibers, carbon fibers, aramid fibers, and metal fibers.

In the case of using the porous metal material in the porous matrix, preferred examples of the metals include Ni, Cu, Al, Ti, Ag, and Fe. In the case of using the porous inorganic material, preferred examples of the inorganic substances include silica, alumina, zeolite, zirconium phosphate, and foamed ceramics. The materials are not limited to the examples.

As compared with the above described porous polytetrafluoroethylene membrane obtained by using the good and poor solvents, the porous matrix used in this invention has higher strength and higher rigidity, and thereby can be more easily handled, under the same porosities.

Among the above materials, the fiber nonwoven fabric is particularly preferred. The fiber nonwoven fabric has a high rigidity even when its porosity is more than 90% by volume, whereby the fiber nonwoven fabric has a light weight and excellent dimensional stability. In other words, in the case of using the fiber nonwoven fabric, the resultant composite porous membrane has a reduced weight and is hardly changed dimensionally.

A scanning electron microscope (SEM) photograph of a surface of a composite porous membrane according to an example of the embodiment is shown in FIG. 1. The composite porous membrane is a composite material containing a glass fiber nonwoven fabric and a polymer. In FIG. 1, substantially straight, relatively large cylinders are the glass fiber, and fine substances connected around the cylinders in a three-dimensional network are the polymer. It should be noted that the polymer shown in FIG. 1 is a polybenzimidazole (hereinafter also referred to as a PBI).

As shown in FIG. 1, the polymer is disposed such that pores of the porous matrix are narrowed by the polymer. Generally pore diameter of a porous matrix is increased as its porosity is increased. In contrast, in the composite porous membrane of the embodiment, the pores are narrowed by the polymer, so that the membrane has a small pore diameter while substantially maintaining the high porosity of the porous matrix. Thus, the composite porous membrane has a remarkably small pore diameter of 0.1 to 1.0 µm in addition to a high porosity of 80% to 98% by volume. For example, in the case of disposing a graft-polymerized proton-conducting polymer in the pores to obtain an electrolyte membrane, the pores can be occluded without increasing the molecular weight of the proton-conducting polymer.

It is preferred that the polymer for the composite porous membrane can be used in combination with a good solvent in which the polymer shows a high solubility and a poor solvent in which the polymer shows a low solubility. In this case, phase separation to be hereinafter described can be easily caused. The polymer is particularly preferably a heterocyclic polymer having a repeating unit derived from a condensed ring compound containing a 6-membered ring and a 5-membered heterocyclic ring. The heterocyclic polymer is excellent in strength, heat resistance, and chemical stability. The heterocyclic polymer may be represented by the following structural formula (1) or (2).

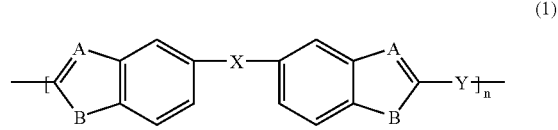

(1)

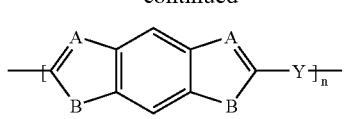
(2)

In the structural formulae (1) and (2), A represents N, S, or O, and B represents NH or NCH$_3$. X represents O, CO, CH$_2$, or a single bond for directly connecting the C atoms in the 6-membered rings, and Y represents one of the following groups.

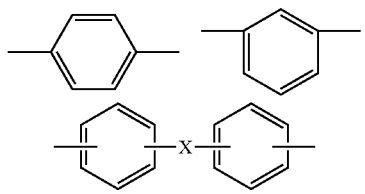

In the above formulae, X has the same meanings as above, and represents O, CO, CH$_2$, or a single bond for directly connecting the C atoms in the 6-membered rings.

It is preferred that A in the above structural formula is N, so that the polymer is a PBI. The PBI is soluble in various organic solvents such as dimethylacetamide, dimethylformamide, and N-methyl-2-pyrrolidinone, and thus can be easily handled in the process for producing the composite porous membrane.

It is further preferred that X between the 6-membered rings is an O atom in the structural formulae (1) and (2), in other words, the polymer has a repeating unit containing an ether bond. The polymer having a main chain containing an ether bond can be intermolecularly crosslinked by a heat treatment to further improve the strength, heat resistance, and chemical stability.

It is also preferred that the polymer is represented by the following structural formula (3) or (4). $Z_1$ in the structural formula (3), and $Z_2$ and $Z_3$ in the structural formula (4) independently represent S, SO$_2$, O, CO, or CH$_2$.

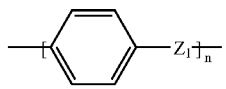
(3)

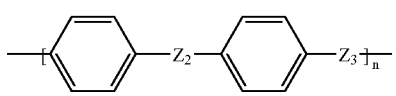
(4)

Also the polymer represented by the structural formula (3) or (4) is excellent in the strength, heat resistance, and chemical stability.

The composite porous membrane can be suitably used as a substrate for carrying a proton-conducting polymer. Thus, the composite porous membrane can be suitably used as a base for an electrolyte of a direct methanol fuel cell, etc.

In this case, since the porous matrix of the composite porous membrane has a high rigidity, the electrolyte is hardly dimensionally changed even when the fuel cell is driven for a long period. Further, since the polymer, which is used in combination with the porous matrix in the composite porous membrane, is excellent in the strength, heat resistance, and chemical stability, the polymer is not removed from the porous matrix and the pores are not widened. As a result, gas leak from one electrode to the other electrode can be prevented.

Furthermore, since the pores have small pore diameters, the pores can be easily occluded by a graft polymer obtained by graft-polymerizing a monomer having a sulfonic acid group, etc. As a result, the gas leak from one electrode to the other electrode can be prevented.

The composite porous membrane may be produced by a method containing the first step S1 of dissolving the polymer in a good solvent to prepare a solution, the second step S2 of impregnating the porous matrix with the solution, and the third step S3 of bringing a poor solvent into contact with the porous matrix impregnated with the solution.

First, in the first step S1, the polymer such as those of the structural formulae (1) to (4) is dissolved in the good solvent.

The good solvent, i.e. a solvent in which the polymer shows a high solubility, may be selected depending on the type of the polymer. In the case of using the PBI, the good solvent may be dimethylacetamide, dimethylformamide, or N-methyl-2-pyrrolidinone. In the case of using a polymer hardly-soluble in such organic solvents, the good solvent may be an inorganic strong acid such as nitric acid, sulfuric acid, or hydrochloric acid, or an organic strong acid such as methanesulfonic acid.

After the solution is prepared by dissolving the polymer in the good solvent, for example, the porous matrix is soaked in the solution in the second step S2. Thus, the porous matrix is impregnated with the solution. A process of dropping, applying, or spraying the solution onto the porous matrix may be used instead of the soaking process. The process of dropping, applying, or spraying may be repeatedly carried out to increase the impregnation amount of the solution.

After the impregnation step, the porous matrix impregnated with the solution is preferably defoamed under reduced pressure.

Then, in the third step S3, the poor solvent is brought into contact with the porous matrix impregnated with the solution (hereinafter also referred to as the impregnated matrix material). Thus, the good solvent in the solution is replaced by the poor solvent, and the phase separation of the solution is caused while the polymer is solidified. In this step, a part of the polymer is fixed to the porous matrix, such that the polymer is stretched against shrinkage owing to the fixation maintained. As a result, the polymer forms the three-dimensional network structure.

The poor solvent may be brought into contact with the impregnated matrix material such that the impregnated matrix material is soaked in the poor solvent. It is preferred that a vapor of the poor solvent is brought into contact with the impregnated matrix material. In this case, the impregnated matrix material may be placed in a chamber filled with the vapor of the poor solvent.

In the process of the vapor contact, the good solvent is slowly replaced by the poor solvent. Thus, the phase separation of the solution moderately proceeds, so that the resulting composite porous membrane has a small pore diameter with a high porosity.

The poor solvent is not particularly limited as long as it is miscible in the good solvent and the polymer is hardly dissolved therein. Preferred examples of the poor solvents include distillated water. The solidification of the polymer can be controlled to obtain desired porosity, pore diameter, polymer shape, etc. such that the poor solvent is not used singly and is used in the state of a mixture with the good solvent.

In the case of using the polymer having a main chain containing an ether bond, the solidified polymer is preferably subjected to a heat treatment. As described above, the polymer can be intermolecularly crosslinked by the heat treatment to further improve the strength, heat resistance, and chemical stability.

Example 1

2 g of 3,3',4,4'-tetraminobiphenyl tetrahydrochloride having the following structural formula was dissolved in 40 g of 116% polyphosphoric acid under an Ar atmosphere at 120° C.

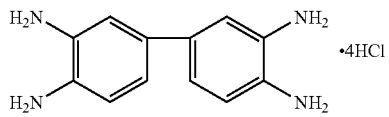

3,3',4,4'-Tetraminobiphenyl Tetrahydrochloride

After all the compound was dissolved and the HCl generation was stopped, 1.304 g of 4,4'-dicarboxydiphenyl ether having the following structural formula was added to and dissolved in the resultant solution. The solution was heated to 160° C. and stirred for 12 hours to accelerate polymerization.

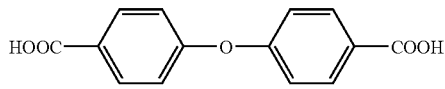

4,4'-Dicarboxydiphenyl Ether

The reaction mixture was poured into a deionized water under rapid stirring, and the generated precipitation was water-washed. Phosphoric acid attached to the precipitation was neutralized with an aqueous sodium hydrogen carbonate solution, and the resultant was water-washed again and vacuum-dried. Thus, a PBI having a molecular weight of 335000, represented by the following structural formula, was obtained at a yield of 98%.

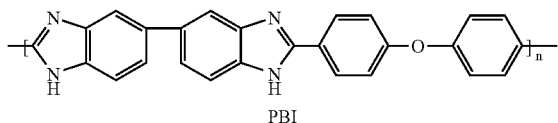

PBI

The PBI was dissolved in N-methyl-2-pyrrolidinone to prepare a 3% PBI solution. The PBI solution was defoamed under a reduced pressure.

A glass fiber nonwoven fabric having a porosity of 94%, a thickness of 45 μm, and a fabric weight of 8 g/m² was placed on a glass plate. The PBI solution was dropped onto the glass fiber nonwoven fabric to impregnate the fabric with the PBI solution.

Then, the impregnated nonwoven fabric was sandwiched between two glass plates, and was soaked in a mixed solvent, in which the weight ratio of deionized water to N-methyl-2-pyrrolidinone is 3 to 7, overnight at the room temperature to solidify the PBI, whereby a composite porous membrane was produced.

The composite porous membrane was soaked in a deionized water together with the glass plates, to separate the membrane from the glass plates. The composite porous membrane was water-washed, vacuum-dried, and heat-treated at 160° C. for 8 hours in the air to intramolecularly crosslink the PBI. Thus obtained product is referred to as a composite porous membrane of Example 1. The SEM photograph of FIG. 1 shows a surface of the composite porous membrane of Example 1.

Composite porous membranes of Examples 2 and 3 were produced in the same manner as Example 1 except for changing the impregnation amount of the PBI solution.

The glass fiber nonwoven fabric impregnated with the PBI solution was placed on a glass plate and left overnight under a humid condition of 90% relative humidity and 25° C. The moisture vapor was absorbed to the PBI solution, and the phase separation of the solution was moderately caused to solidify the PBI. Then, a composite porous membrane of Example 4 was produced in the same manner as in Examples 1 to 3.

A composite porous membrane of Example 5 was produced in the same manner as Example 4 except for changing the impregnation amount of the PBI solution.

For comparison, a porous PBI membrane of Comparative Example 1 was produced from the PBI solution used in Example 1. The porous PBI membrane of Comparative Example 1 was produced such that the PBI solution was dropped onto a glass plate, cast into a thickness of 0.5 mm by a doctor blade method, and subjected to the same process as in Example 1.

A commercially available, stretched porous polytetrafluoroethylene membrane was used as a membrane of Comparative Example 2.

The porosity and average pore diameter of each membrane of Examples 1 to 5 and Comparative Examples 1 and 2 were measured by a mercury porosimeter. Further, a strip sample having a width of 5 mm and a length of 20 mm was cut from each membrane, and the tensile elasticity thereof was evaluated. The results are shown in FIG. 2 together with the impregnation amounts of the PBI solution.

As shown in FIG. 2, the composite porous membranes of Examples 1 to 5 had smaller average pore diameters with higher porosities, and had remarkably higher rigidities. In contrast, in Comparative Examples 1 and 2, more than one of the high porosity, small average pore diameter, and high rigidity could not be achieved.

It is clear from the above results that the composite porous membranes of Examples 1 to 5 can be suitably used as a base of a proton-conducting membrane having a proton-conducting polymer, i.e. a base of an electrolyte membrane of a direct methanol fuel cell, etc.

Although certain preferred embodiments of the present invention have been shown and described in detail, it should be understood that various changes and modifications may be made therein without departing from the scope of the appended claims.

What is claimed is:

1. A composite porous membrane comprising a porous matrix and a polymer, wherein said porous matrix comprises a fiber woven fabric, a fiber nonwoven fabric, a porous metal material, or a porous inorganic material, said polymer forms a three-dimensional network structure in said porous matrix, and said composite porous membrane has a porosity of 80% to 98% by volume and an average pore diameter of 1.0 μm or less, wherein said polymer comprises a repeating unit derived from a condensed ring compound containing a 6-membered ring and a 5-membered heterocyclic ring.

2. A composite porous membrane according to claim 1, wherein said porous matrix comprises said fiber nonwoven fabric.

3. A composite porous membrane according to claim 1, wherein said polymer is represented by the following structural formula (1) or (2):

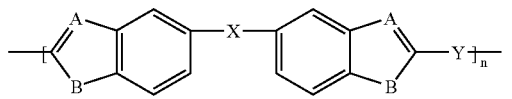 (1)

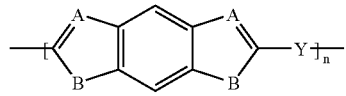 (2)

wherein A represents N, S, or O, B represents NH or NCH$_3$, X represents O, CO, CH$_2$, or a single bond for directly connecting the C atoms in the 6-membered rings, and Y represents one of the following groups:

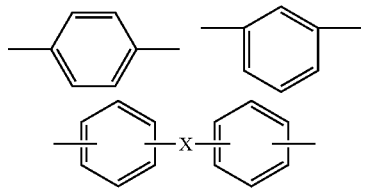

wherein X represents O, CO, CH$_2$, or a single bond for directly connecting the C atoms in the 6-membered rings.

4. A composite porous membrane according to claim 3, wherein said polymer is a polybenzimidazole.

* * * * *